(12) United States Patent
Miki et al.

(10) Patent No.: US 10,774,797 B2
(45) Date of Patent: Sep. 15, 2020

(54) AIR INTAKE STRUCTURE OF SADDLE RIDING VEHICLE

(71) Applicant: HONDA MOTOR CO., LTD., Tokyo (JP)

(72) Inventors: Sosuke Miki, Asaka (JP); Naomichi Katori, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/676,154

(22) Filed: Nov. 6, 2019

(65) Prior Publication Data

US 2020/0158057 A1 May 21, 2020

(30) Foreign Application Priority Data

Nov. 16, 2018 (JP) .................................. 2018-215972

(51) Int. Cl.
| | | |
|---|---|---|
| F02M 35/16 | (2006.01) | |
| F02M 35/10 | (2006.01) | |
| F02M 35/024 | (2006.01) | |
| B01D 46/00 | (2006.01) | |
| F02M 61/14 | (2006.01) | |
| F02M 35/04 | (2006.01) | |

(52) U.S. Cl.
CPC ... *F02M 35/10216* (2013.01); *B01D 46/0045* (2013.01); *F02M 35/02416* (2013.01); *F02M 35/044* (2013.01); *F02M 35/10052* (2013.01); *F02M 35/10118* (2013.01); *F02M 35/162* (2013.01); *F02M 61/145* (2013.01); *B01D 2279/60* (2013.01)

(58) Field of Classification Search
CPC ......... F02M 35/02416; F02M 35/0245; F02M 35/044; F02M 35/10052; F02M 35/10118; F02M 35/10216; F02M 35/162; F02M 61/145
USPC .......................................... 123/470
See application file for complete search history.

(56) References Cited

U.S. PATENT DOCUMENTS

| | | | | |
|---|---|---|---|---|
| 2005/0045147 A1* | 3/2005 | Ishikawa | ........... | F02M 35/10039 123/336 |
| 2005/0205067 A1* | 9/2005 | Koide | .............. | F02M 35/10216 123/470 |
| 2007/0175431 A1* | 8/2007 | Yokoi | .............. | F02M 35/10039 123/184.55 |

(Continued)

FOREIGN PATENT DOCUMENTS

JP 2005-343356 12/2005

*Primary Examiner* — Erick R Solis
(74) *Attorney, Agent, or Firm* — Rankin, Hill & Clark LLP

(57) ABSTRACT

An air intake structure of a saddle riding vehicle disposed on a saddle riding vehicle that includes intake system components above an engine, the engine includes a plurality of cylinders aligned at least in front and rear, the intake system components include: funnels coupled to intake ports of the respective cylinders; and injectors facing openings of the respective funnels, the funnels and the injectors are arranged inside the air box, the air intake structure includes an air filter in a front side with respect to the funnel and the injector disposed in a cylinder in a front side. In the air intake structure of a saddle riding vehicle, the air filter is at least disposed so as to be oriented in a vertical direction in side view, and the air filter has a middle part on which a louver is disposed.

9 Claims, 10 Drawing Sheets

(56) References Cited

U.S. PATENT DOCUMENTS

2007/0289583 A1* 12/2007 Konakawa ....... F02M 35/10052
    123/590
2010/0108010 A1* 5/2010 Matsuda ......... F02M 35/10032
    123/184.56

* cited by examiner

AIR INTAKE STRUCTURE OF SADDLE RIDING VEHICLE

INCORPORATION BY REFERENCE

The present application claims priority under 35 U.S.C. § 119 to Japanese Patent Application No. 2018-215972 filed on Nov. 16, 2018. The content of the application is incorporated herein by reference in its entirety.

TECHNICAL FIELD

The present invention relates to an air intake structure of a saddle riding vehicle.

BACKGROUND ART

Conventionally, there is known an air intake structure of a saddle riding vehicle in which intake air funnels corresponding to cylinders in front and rear are arranged within an air box, and an injector is disposed at a position facing an opening surface of each funnel (for example, see Patent Literature 1). In Patent Literature 1, an air filter is arranged forward with respect to the injector.

CITATION LIST

Patent Literature

[Patent Literature 1] JP-A No. 2005-343356

SUMMARY OF INVENTION

Technical Problem

In Patent Literature 1, since an intake air enters from a front side, the intake air that passes through an air filter flows to a rear side through the injector and the funnel in the front side, and thus, even though an intake system in the front side is located at a position where the air is easily taken in compared with an intake system in the rear side, it is considered that there may be a case where a direct suction of fuel fails due to momentum of the intake air.

The present invention is made in consideration of the above-described circumstance, and it is an objective of the present invention to provide an air intake structure of a saddle riding vehicle configured to efficiently distribute an intake air to intake systems in front and rear, while dispersing momentum of the intake air received by an intake system in a front side.

Solution to Problem

An air intake structure of a saddle riding vehicle is disposed on the saddle riding vehicle (1) that includes intake system components (35, 91, 92, 94, 95) above an engine (11), the engine (11) includes a plurality of cylinders, and includes cylinders aligned at least in front and rear, the intake system components (35, 91, 92, 94, 95) include: funnels (91, 92) coupled to intake ports of the respective cylinders; and injectors (93) arranged at positions facing openings of the respective funnels (91, 92), the funnels (91, 92) and the injectors (93) are arranged inside an air box (35), and the air intake structure includes an air filter (84) in a front side with respect to the funnel (91) and the injector (93) disposed in a cylinder in a front side. In the air intake structure of the saddle riding vehicle, the air filter (84) is at least disposed so as to be oriented in a vertical direction in side view, and the air filter (84) has a middle part on which a louver (88) is disposed.

In the above configuration, the air box (35) may be in a bowl shape with an opened upper surface, and in a shape with an upper portion covered with a lid member (62), and the injectors (93) may be supported by towers (96) disposed on the funnels (91, 92).

In the above configuration, the louver (88) may be positioned in an upper side with respect to the injector (93) in a front side.

In the above configuration, the louver (88) may project to a side of a dirty side (86).

In the above configuration, the air box (35) may have a front end on which an intake air opening (61b) coupled to an intake passage (10a) is disposed, and the louver (88) may extend up to a position where the louver (88) overlaps with the intake passage (10a) in side view.

In the above configuration, the intake passage (10a) may have a lower side portion on which a guiding portion (82a) that orients upward may be provided.

In the above configuration, the guiding portion (82a) may have an upper end positioned in an upper side with respect to an upper side portion (91a) of the front side funnel (91).

In the above configuration, the intake passage (10a) may have an upper side portion (82f) that inclines upwardly toward the rear, and a space may be provided between an upper portion of the louver (88) and the upper side portion (82f) of the intake passage (10a).

In the above configuration, the injector (93) in a rear side may be positioned in an upper side with respect to the front side injector (93).

Advantageous Effects of Invention

The air intake structure of a saddle riding vehicle is disposed on the saddle riding vehicle that includes intake system components above an engine, the engine includes a plurality of cylinders, and includes cylinders aligned at least in front and rear, the intake system components include: funnels coupled to intake ports of the respective cylinders; and injectors arranged at positions facing openings of the respective funnels, the funnels and the injectors are arranged inside an air box, and the air intake structure includes an air filter in a front side with respect to the funnel and the injector disposed in a cylinder in a front side. In the air intake structure of the saddle riding vehicle, the air filter is at least disposed so as to be oriented in a vertical direction in side view, and the air filter has a middle part on which a louver is disposed. With this configuration, disposing the louver gives the intake air a directionality to ensure taking in the air such that the air is oriented to an upper side in the air box, thereby ensuring easily flowing the intake air to a rear side intake system (funnel and injector).

In the above configuration, the air box may be in a bowl shape with an opened upper surface, and in a shape with an upper portion covered with a lid member, and the injectors may be supported by towers disposed on the funnels. With this configuration, since the injectors are supported by the intake system component inside the air box, the space in the upper side of the injectors can be an intake passage.

In the above configuration, the louver may be positioned in an upper side with respect to the injector in a front side. With this configuration, the intake air can be oriented to an upper side of the front side injector.

In the above configuration, the louver may project to a side of a dirty side. With this configuration, the louver is disposed in the space in the dirty side upstream of the air filter, thereby no influence on a volume in a side of the clean side.

In the above configuration, the air box may have a front end on which an intake air opening coupled to an intake passage is disposed, and the louver may extend up to a position where the louver overlaps with the intake passage in side view. With this configuration, the louver is a long louver in front and rear that extends up to the intake passage, thereby ensuring giving a directionality to the intake air.

In the above configuration, the intake passage may have a lower side portion on which a guiding portion that orients upward may be provided. With this configuration, the flow of the intake air flowing in from the upper stream of the intake passage is oriented upward, thereby ensuring actively orienting the intake air to the louver side while reducing the intake air directly flowing into the intake system components on the front side inside the air box.

In the above configuration, the guiding portion may have an upper end positioned in an upper side with respect to an upper side portion of the front side funnel. Furthermore, this configuration ensures actively orienting the intake air to the louver side while reducing the intake air directly flowing into the intake system components on the front side inside the air box.

In the above configuration, the intake passage may have an upper side portion that inclines upwardly toward the rear, and a space may be provided between an upper portion of the louver and the upper side portion of the intake passage. This configuration ensures the intake air flowing into the air filter in an upper side of the louver.

In the above configuration, the injector in a rear side may be positioned in an upper side with respect to the front side injector. This configuration ensures the rear side injector easily suctioning the intake air flowing into the upper side.

DESCRIPTION OF EMBODIMENTS

Figure 1:
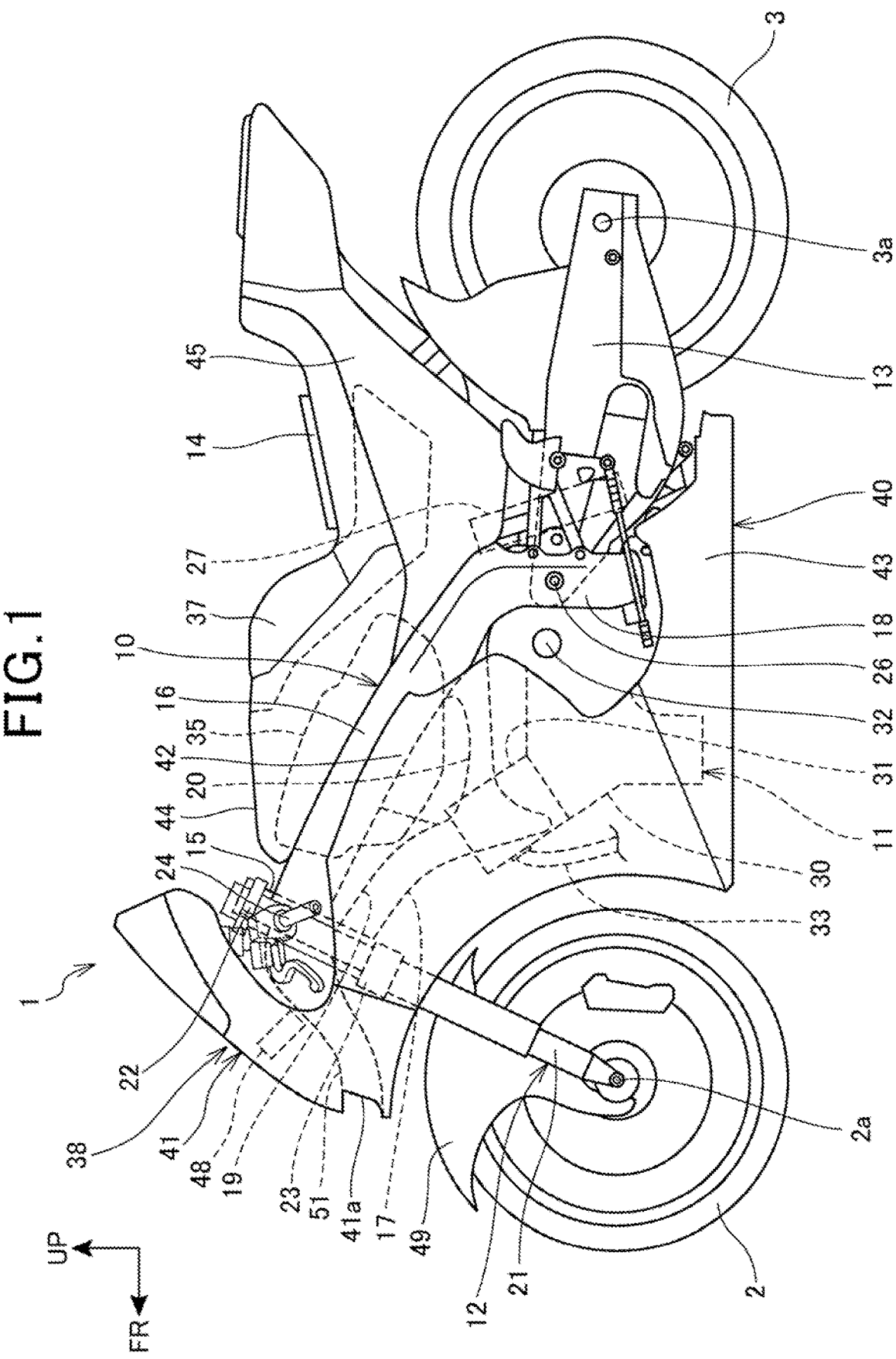
FIG. 1 is a left side view illustrating a motorcycle according to an embodiment of the present invention.

Hereinafter, one embodiment of the present invention will be described with reference to the drawings. It is to be noted that, throughout the description, references to directions, such as front, rear, left, right, upward, and downward, are made identical to directions with respect to a vehicle body, unless otherwise stated. It is also to be noted that, in the drawings, a reference sign FR denotes the front of the vehicle body, a reference sign UP denotes the upper side of the vehicle body, and a reference sign LH denotes the left of the vehicle body.

FIG. 1 is a left side view illustrating a motorcycle 1 according to the embodiment of the present invention.

The motorcycle 1 is a vehicle in which an engine 11 is supported by a body frame 10, a front fork 12 that steerably supports a front wheel 2 is steerably supported by a front end portion of the body frame 10, and a swing arm 13 that supports a rear wheel 3 is disposed at a rear of the body frame 10. The motorcycle 1 is a saddle riding vehicle on which an occupant straddles on a seat 14 to seat, and the seat 14 is disposed on the upper side of the rear of the body frame 10.

The body frame 10 includes a head tube 15 positioned in a center in a vehicle width direction, a left and right pair of main frames 16, a left and right pair of down frames 17, a left and right pair of pivot frames 18, a left and right pair of seat frames (not illustrated), and a left and right pair of gussets 19.

The head tube 15 is disposed at a front end of the body frame 10 and supports the front fork 12. The main frame 16 rearwardly extends downward to the rear from an upper portion of the head tube 15. The down frame 17 extends rearward and downward from a lower portion of the head tube 15.

The pivot frame 18 extends downward from a rear end portion of the main frame 16. The above-described seat frame extends rearward from the rear end portion of the main frame 16 and supports the seat 14. The gusset 19 couples a front end portion of the main frame 16 with a front end portion of the down frame 17 in a vertical direction. A lower end portion of the down frame 17 and a rear portion of the main frame 16 are coupled by a coupling portion 20 that extends forward and rearward.

The front fork 12 includes a steering shaft (not illustrated), a left and right pair of fork pipes 21, a top bridge 22, a bottom bridge 23, and a steering handlebar 24.

The steering shaft is turnably supported by the head tube 15. The left and right fork pipes 21 are telescopic buffers. The top bridge 22 is secured to an upper end of the above-described steering shaft, and couples upper portions of the left and right fork pipes 21. The bottom bridge 23 is secured to a lower end of the above-described steering shaft and couples the left and right fork pipes 21. The steering handlebar 24 is secured to the upper portions of the fork pipes 21.

The front wheel 2 is supported by a front wheel shaft 2a passed between lower end portions of the left and right fork pipes 21.

The swing arm 13 has a front end portion supported by a pivot shaft 26 passed between the left and right pivot frames 18, and is swingable in a vertical direction with the pivot shaft 26 as a center.

The rear wheel 3 as a driving wheel is supported by a rear wheel shaft 3a disposed at a rear end portion of the swing arm 13.

The swing arm 13 is suspended on the vehicle body via a cushion unit 27.

The engine 11 is disposed between the down frames 17 and the pivot frames 18 under the main frames 16, and is supported by the body frame 10.

The engine 11 includes a crankcase 30 that houses a crankshaft (not illustrated) extending in the vehicle width direction (in left and right direction) and a cylinder portion 31 extending upward from an upper portion of a front portion of the crankcase 30.

In a rear portion of the crankcase 30, a transmission (not illustrated) that decelerates and outputs a rotation of the engine 11 is built-in. The output of the engine 11 is transmitted to the rear wheel 3 via a driving chain (not illustrated) passed between an output shaft 32 of the above-described transmission and the rear wheel 3.

An exhaust pipe 33 of the engine 11 is extracted downward from an exhaust port on a front surface of the cylinder portion 31, and extends rearward passing through under the crankcase 30.

An air cleaner box 35 of an intake system of the engine 11 is arranged between the left and right main frames 16 above the engine 11. As viewed in the side view of the vehicle, the main frames 16 overlap the air cleaner box 35 from outside. The air cleaner box 35 is arranged between the head tube 15 and a fuel tank 37 in a vehicle front and rear direction.

An intake air purified by the air cleaner box 35 flows to the intake port of the cylinder portion 31 through an intake passage (not illustrated).

The fuel tank 37 is arranged above rear portions of the main frames 16, and is arranged between the seat 14 and the air cleaner box 35 in the vehicle front and rear direction.

The motorcycle 1 includes a vehicle body cover 38 that covers the vehicle body.

The vehicle body cover 38 includes a cowl 40 that covers the front portion and the lower portion of the vehicle body, an upper cover 44 that covers the air cleaner box 35 from an upper side, and a rear cover 45 that covers the rear portion of the vehicle body.

The cowl 40 is formed of an upper cowl 41 that covers the upper portion of the front fork 12 and the head tube 15 from a front side, a left and right pair of middle cowls 42 that cover the front portion of the body frame 10 and the engine 11 from left and right sides, and a lower cowl 43 that covers the engine 11 and the body frame 10 from a lower side.

The upper cowl 41 has a front surface on which an opening 41a that takes in a travelling air is formed. The opening 41a has an edge portion to which a front end portion of an intake duct 51 that guides the travelling air to a side of the air cleaner box 35 is coupled.

Between the upper cowl 41 and the head tube 15, a meter 48 that displays information, such as a vehicle speed, is arranged.

A front fender 49 is supported by the left and right fork pipes 21.

Figure 2:
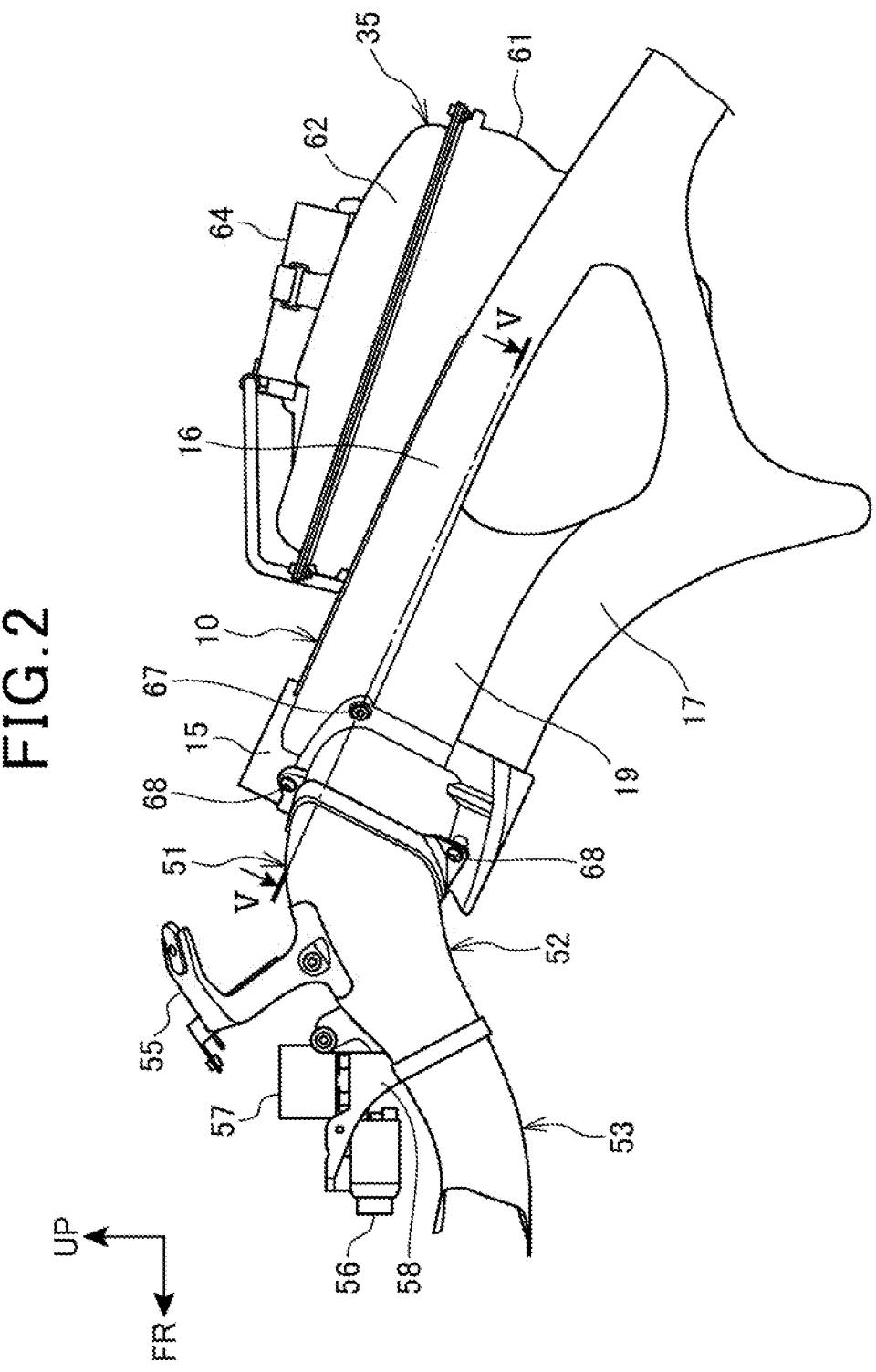
FIG. 2 is a left side view illustrating a body frame, an air cleaner box, and an intake duct.

FIG. 2 is a left side view that illustrates the body frame 10, the air cleaner box 35, and the intake duct 51.

Ahead of the head tube 15 of the body frame 10, the intake duct 51 is disposed.

The intake duct 51 is a component of a two-split structure configured of a rear duct 52 disposed on a side of the head tube 15 and a front duct 53 that has a rear end portion coupled to a front end portion of the rear duct 52.

The rear duct 52 supports a rear side stay 55 and a front side stay 58. The rear side stay 55 supports the upper cowl 41 (see FIG. 1) and includes the meter 48 (see FIG. 1). The front side stay 58 supports a junction box 57 that houses a camera 56 that photographs ahead of the vehicle and coupling portions of wirings of electric components. The camera 56 may be annexed to a recorder that has a function to record a photographed video or a recording function.

The air cleaner box 35 includes a box main body 61 in an open-topped box shape and a box cover 62 that covers the upper opening of the box main body 61, and is arranged between the left and right main frames 16.

The box cover 62 has an upper portion on which an Electronic Control Unit (ECU) 64 is mounted. Here, the ECU 64 also includes an engine control unit that controls the engine 11 (see FIG. 1).

The ECU 64 is covered with the fuel tank 37 (see FIG. 1) and the upper cover 44 (see FIG. 1) from an upper side.

Figure 3:
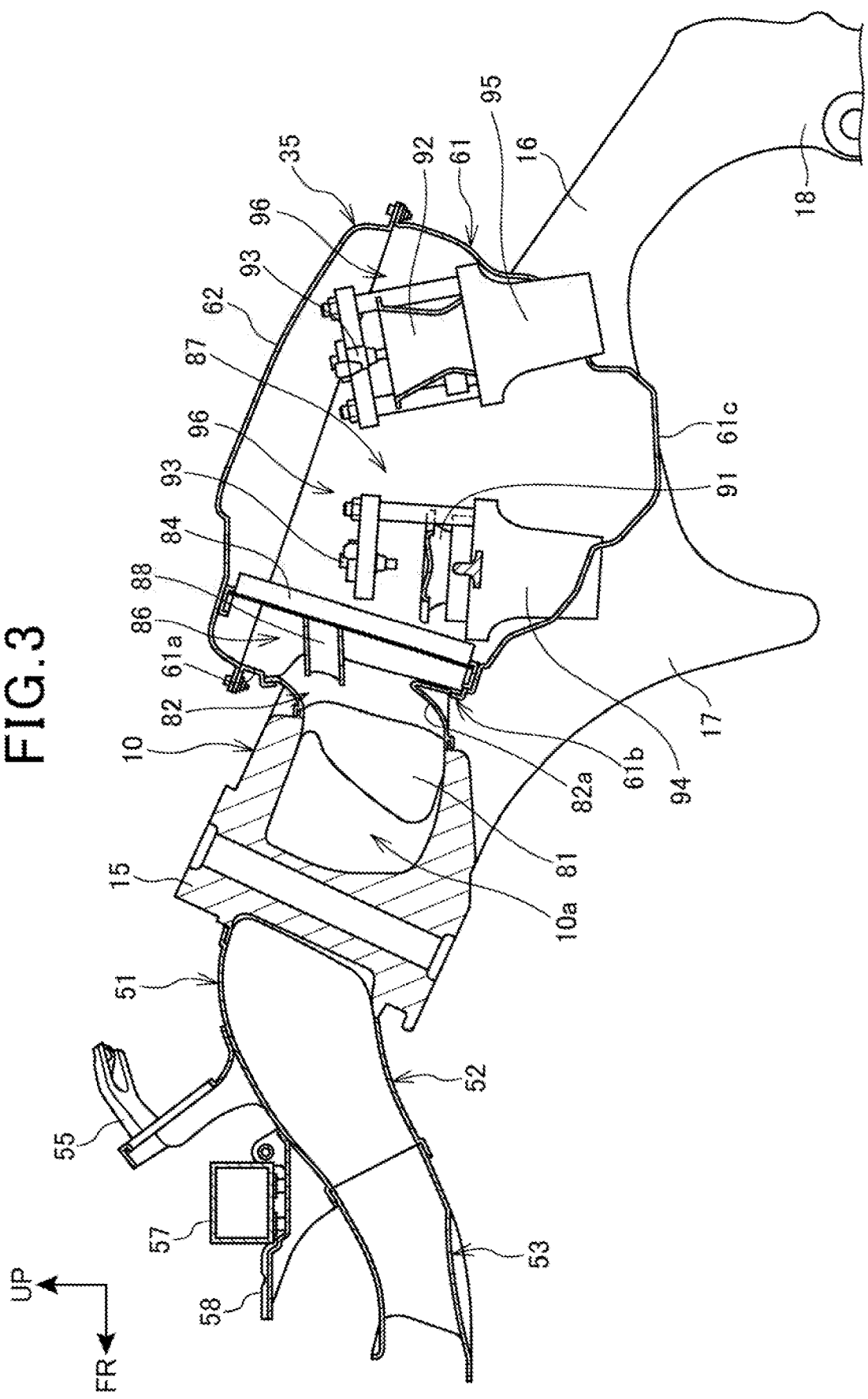
FIG. 3 is a cross-sectional view of the body frame, the air cleaner box, and the intake duct vertically cut off on a vehicle body centerline extending forward and rearward.

FIG. 3 is a cross-sectional view of the body frame 10, the air cleaner box 35, and the intake duct 51 vertically cut off on a vehicle body centerline extending forward and rearward.

The body frame 10 includes an intake passage 10a that passes through left and right sides of the head tube 15 to extend rearward with respect to the head tube 15.

The intake passage 10a has a front end portion coupled to the intake duct 51 (specifically, the rear duct 52). On an inner circumferential surface of a rear end portion of the intake passage 10a, a pipe-shaped attachment 81 is bonded. Furthermore, the attachment 81 has a rear edge to which a front edge of a pipe-shaped joint 82 is fitted and coupled.

The joint 82 includes a guiding portion 82a that guides the air upward on an inner surface in a lower portion.

The joint 82 has a rear edge that is coupled to an edge of an opening 61b formed on a front wall 61a of the box main body 61.

The air cleaner box 35 internally includes a filter element 84 vertically arranged over the box main body 61 and the box cover 62, and has a front side facing forward of the vehicle.

The filter element 84 is a component that purifies an air introduced via the intake duct 51 and the intake passage 10a. The filter element 84 partitions an inside of the air cleaner box 35 into a dirty side 86 on a side of the intake passage 10a and a clean side 87 on a rear portion side of the air cleaner box 35.

The filter element 84 includes an air guide port 88 that projects into the dirty side 86.

The air guide port 88 functions to cause a part of an air flow inside the dirty side 86 to move toward an upper portion in the clean side 87.

In the clean side 87, a plurality of throttle bodies 94, 95, a plurality of air funnels 91, 92 mounted on upper portions of the respective throttle bodies 94, 95, and injectors 93 disposed to face respective openings of the air funnels 91, 92 are disposed. The respective injectors 93 inject the fuel into the respective air funnels 91, 92 to supply the fuel to each cylinder of the engine 11.

The above-described throttle bodies 94, 95 pass through a bottom wall 61c of the box main body 61 to be coupled to the cylinder portion 31 (see FIG. 1) of the engine 11 (see FIG. 1).

As described above, disposing the air guide port 88 in the filter element 84 ensures giving an air that flows into the clean side 87 a directionality so as to flow the air toward the upper portion in the clean side 87.

Figure 4:
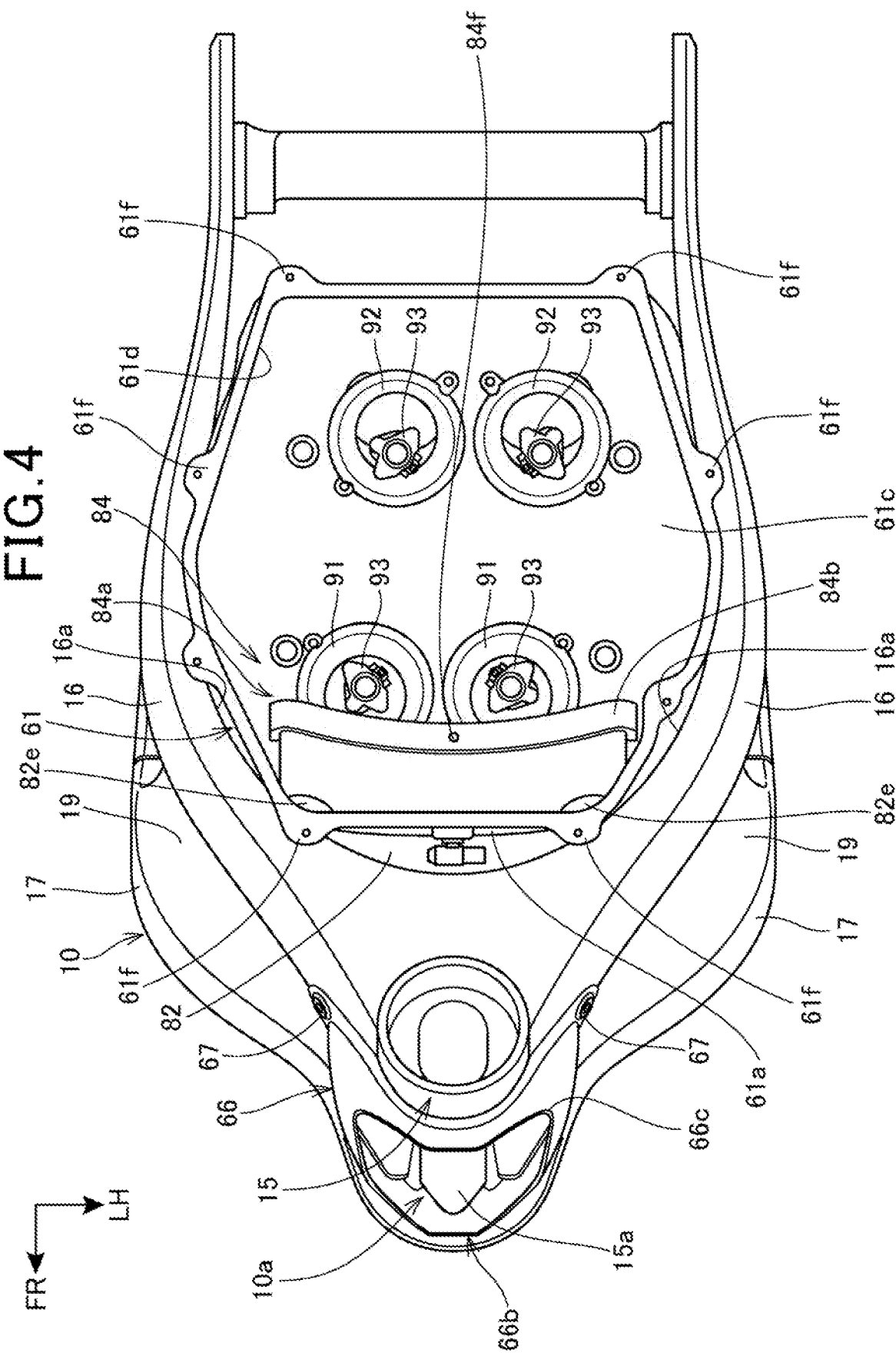
FIG. 4 is a plan view illustrating a positional relationship among the body frame, a box main body, and a joint.

FIG. 4 is a plan view that illustrates a positional relationship among the body frame 10, the box main body 61, and the joint 82.

The front side of the head tube 15 supports a duct supporting member 66. The duct supporting member 66 is mounted with a plurality of bolts 67 over the head tube 15, the left and right main frames 16, the left and right down frames 17, and the left and right gussets 19. The duct supporting member 66 configures a part of the body frame 10.

The duct supporting member 66 has a front end portion that has a front opening 66b. The intake passage 10a is formed behind the front opening 66b.

The front opening 66b has an edge portion 66c whose center portion in the vehicle width direction projects forward with respect to the head tube 15. The edge portion 66c is formed to be positioned gradually rearward as approaching toward an outside in the vehicle width direction from the center portion in the vehicle width direction.

The duct supporting member 66 is coupled to the rear duct 52 of the intake duct 51. In details, the rear duct 52 has a rear end portion at which a body frame coupling portion 52x is disposed. The body frame coupling portion 52x of the rear duct 52 is coupled to the duct supporting member 66 and is mounted with a plurality of bolts 68 (see FIG. 2).

Figure 5:
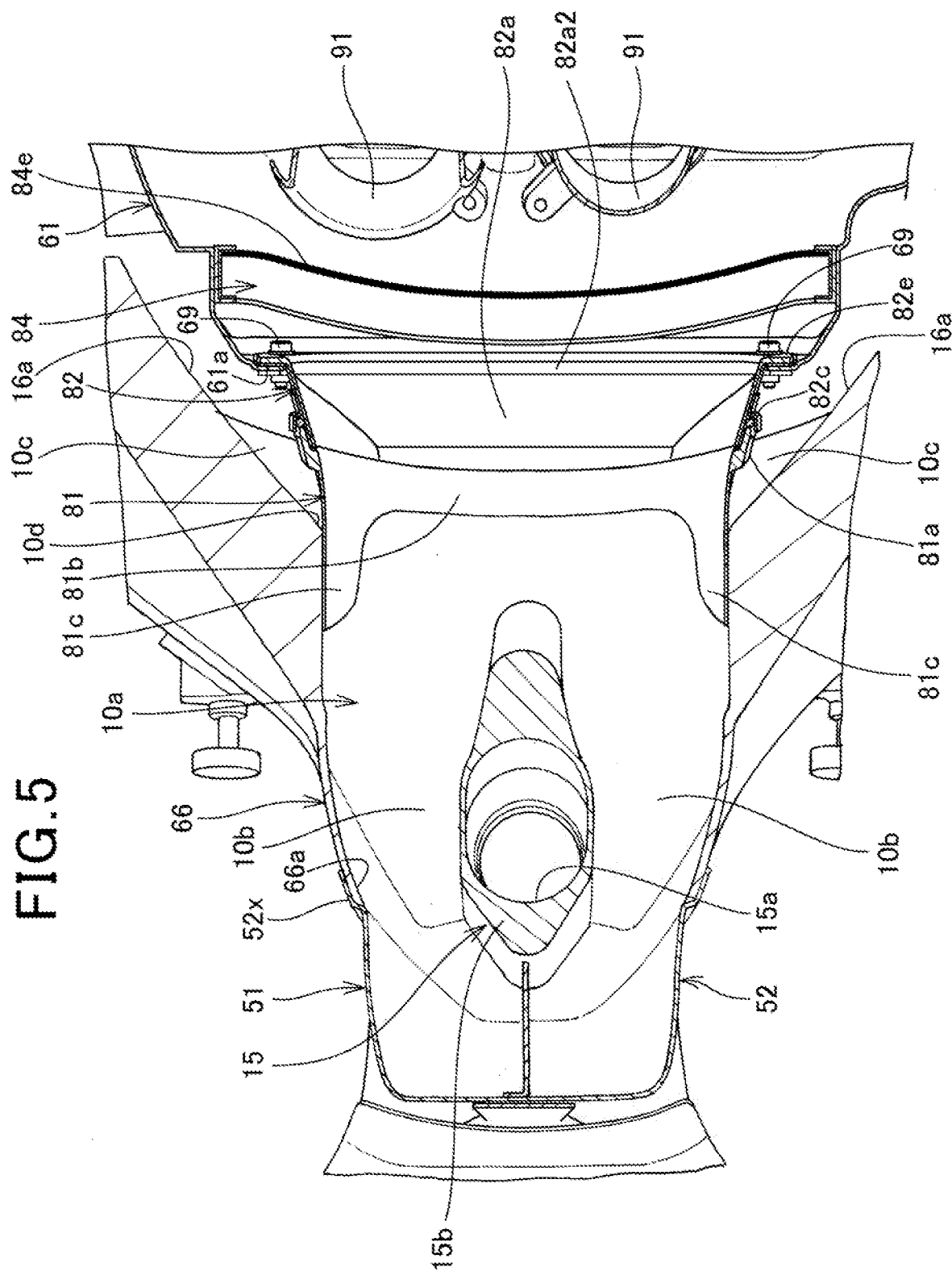
FIG. 5 is a cross-sectional view taken along the line V-V in FIG. 2.

FIG. 5 is a cross-sectional view taken along the line V-V in FIG. 2.

The head tube 15 has a middle portion 15b in a longitudinal direction whose cross-sectional outer shape is formed into a streamline. The head tube 15 has a shaft insertion hole 15a into which the above-described steering shaft is inserted.

The intake passage 10a of the body frame 10 has a left and right pair of branch passages 10b branched to respective both side portions in the vehicle width direction of the head tube 15.

As described above, forming the cross-sectional shape of the head tube 15 into the streamline reduces a generation of a turbulent flow in the flow of air flowing into the intake passage 10a, thereby ensuring a further smooth airflow.

On inner walls 16a of the left and right main frames 16 in the body frame 10, head tube rear walls 10c arranged behind the head tube 15 are sequentially disposed.

On the head tube rear wall 10c, a rear opening 10d that rearwardly opens the intake passage 10a is formed. The rear opening 10d is formed into an approximately rectangular shape as viewed from a rear side. Through the rear opening 10d, the pipe-shaped attachment 81 is disposed on an inner surface of the intake passage 10a. The attachment 81 is bonded to the body frame 10. The attachment 81 has an internal space that configures the intake passage 10a integral with the head tube 15.

Figure 6:
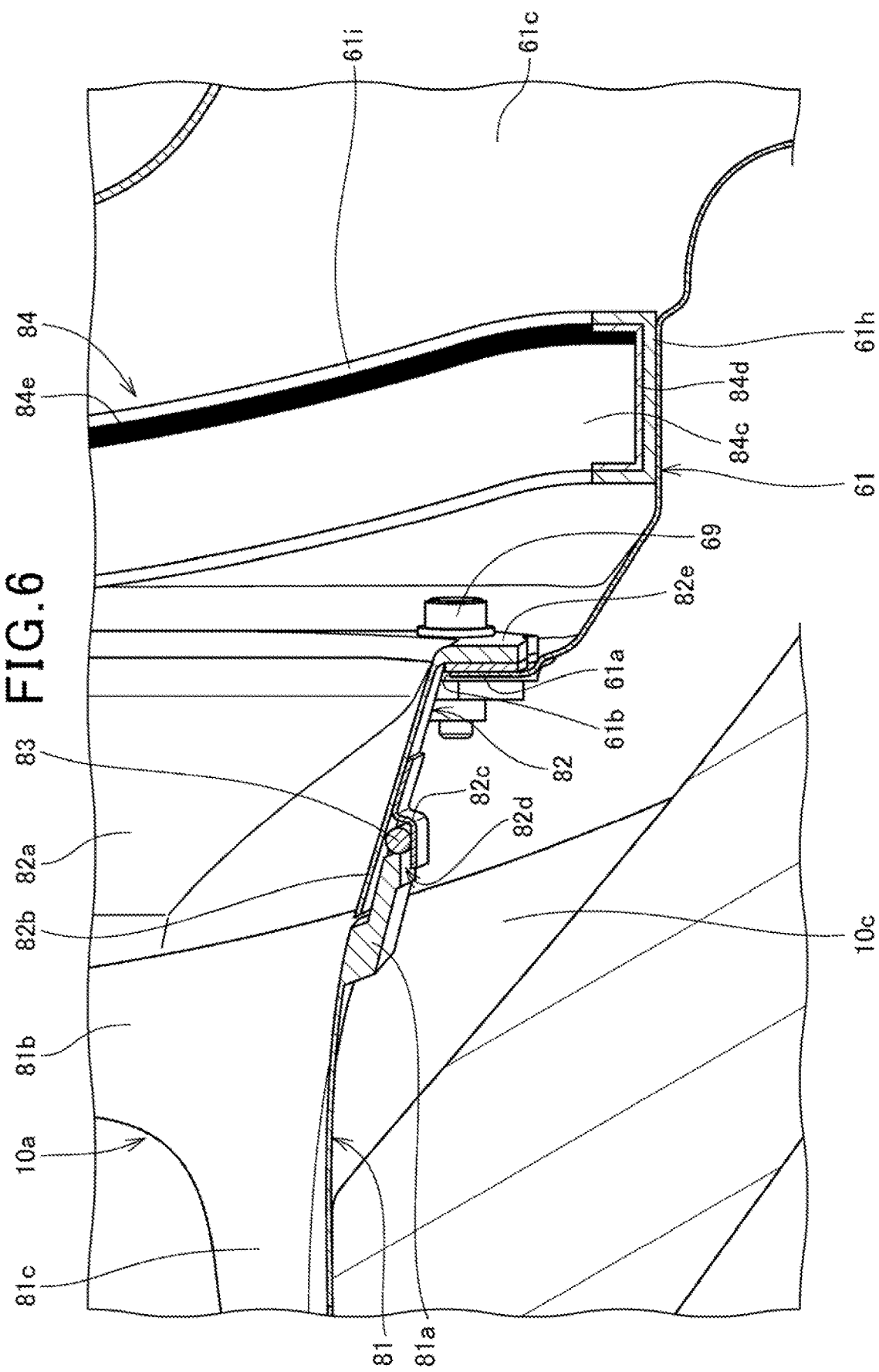
FIG. 6 is a main part enlarged view of FIG. 5.

FIG. 6 is a main part enlarged view of FIG. 5.

The attachment 81 includes a main body 81b in an approximately rectangular pipe shape. The main body 81b includes a left and right pair of sidewall portions 81c. The sidewall portion 81c extends forward with respect to an upper portion and a lower portion of the main body 81b. The sidewall portion 81c has a front edge formed to be downward to the front as illustrated in FIG. 3. The main body 81b has a rear portion where a rear edge portion 81a that radially expands is formed. The rear edge portion 81a is formed to be thicker than the main body 81b. The rear edge portion 81a is supported with a width in the front and rear direction larger than the thickness of the rear edge portion 81a. The rear edge portion 81a is made more difficult to deform than the main body 81b.

The rear edge portion 81a is coupled to the pipe-shaped joint (rear side intake duct) 82 that slightly tapers as approaching forward. The joint 82 is made of resin. The joint 82 includes an opened distal end portion 82b at a front end portion. The distal end portion 82b is inserted into the rear edge portion 81a of the attachment 81. The distal end portion 82b is formed to have the opening shape that matches the main body 81b of the attachment 81, and the distal end portion 82b of the joint 82 continuously extends from the main body 81b of the attachment 81. Since the attachment 81 and the joint 82 are made of resin, they can be coupled using the elasticity of the resin. Coupling the joint 82 to the intake passage 10a via the attachment 81 ensures easy attaching and improved air tightness.

The distal end portion 82b has an outer periphery where an attachment receiving portion 82c is formed. The attachment receiving portion 82c is formed into a pipe shape. The attachment receiving portion 82c radially expands so as to bend forward. The attachment receiving portion 82c forms a ring-shaped and clearance-shaped fitting groove 82d between the attachment receiving portion 82c and the distal end portion 82b.

In the fitting groove 82d, an annular seal 83 is arranged. Into the fitting groove 82d, the rear edge portion 81a of the attachment 81 is inserted. The seal 83 is pressed onto the attachment receiving portion 82c by the rear edge portion 81a to seal the gap between the attachment 81 and the joint 82. When the joint 82 is attached to the attachment 81, the attachment receiving portion 82c ensures reliably coupling the attachment 81 and the joint 82, and ensures the improved air tightness.

The joint 82 extends into an inside of the box main body 61 through the opening 61b of the box main body 61. The joint 82 has a rear end on which a flange portion 82e is formed. The flange portion 82e radially expands larger than the opening 61b of the box main body 61. The flange portion 82e is mounted to the front wall 61a with a plurality of bolts 69 in a state of being in contact with the inside of the box main body 61, that is, a rear surface (internal surface) of the front wall 61a of the box main body 61. Accordingly, the joint 82 can be supported in the air cleaner box 35 with a simple structure.

When the joint 82 is attached to the box main body 61, the distal end portion 82b of the joint 82 is inserted into the opening 61b from the inside of the box main body 61. Then, the joint 82 is inserted until the flange portion 82e is brought into contact with the front wall 61a, and the flange portion 82e is secured with the plurality of bolts 69. Since the joint 82 is a separate body from the air cleaner box 35, and the joint 82 is arranged through the opening 61b from the inside of the air cleaner box 35, it is possible to couple to the intake passage 10a after the air cleaner box 35 is positioned on the body frame 10, thereby providing a good attachability. The joint 82 can be attached by visually perceiving through the opening 61b.

Figure 7:
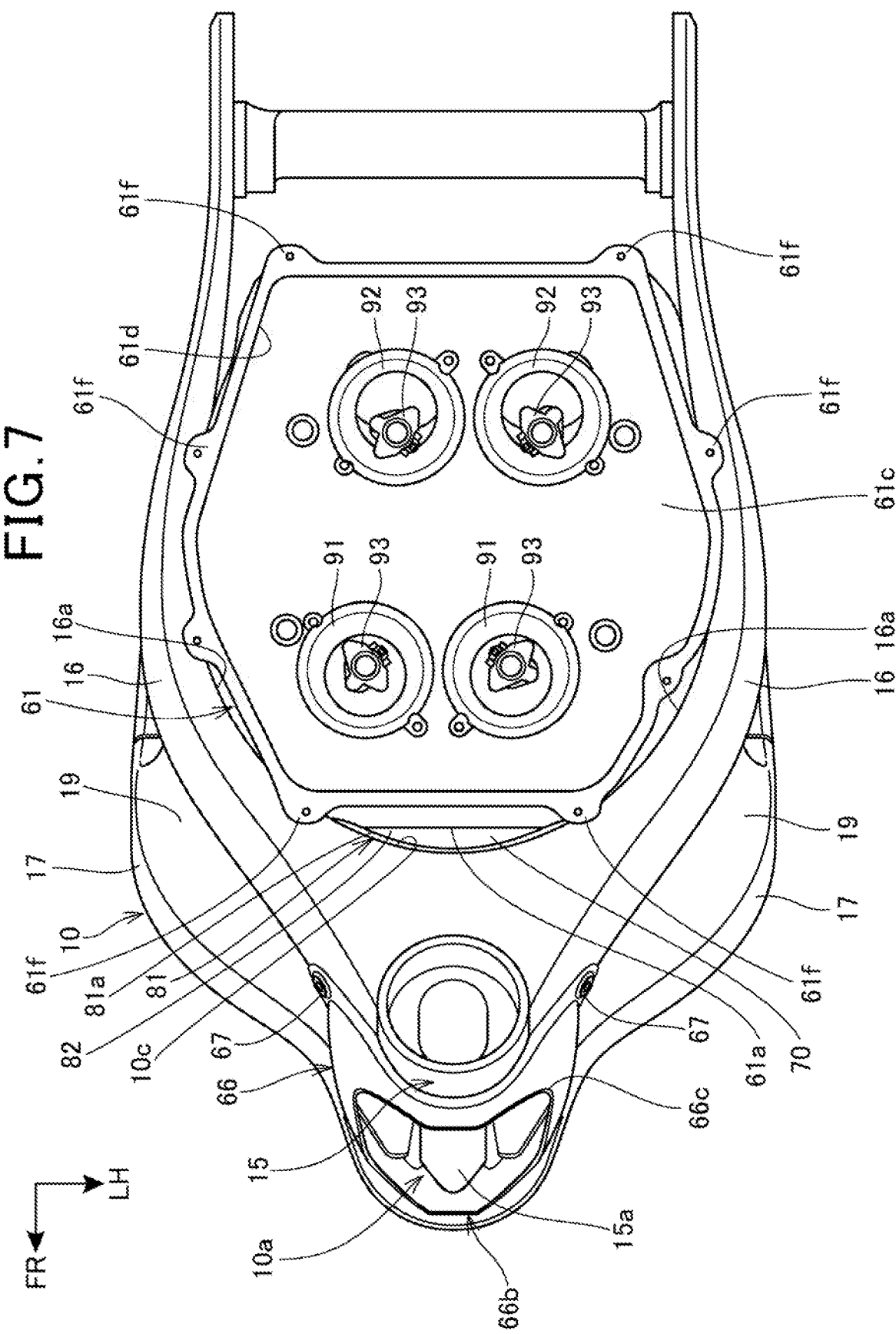
FIG. 7 is a drawing in which the joint and the filter element are removed from FIG. 6.

FIG. 7 is a drawing in which the joint 82 and the filter element 84 are removed from FIG. 6.

In plan view, the front wall 61a of the box main body 61 linearly extends in the left and right direction. Meanwhile, the body frame (frame) 10 forms an approximately U shape depressed forward with the head tube 15 and the left and right pair of main frames 16 as seen in a plan view. Between the front wall 61a of the box main body 61 and the head tube rear wall (U-shaped bottom portion) 10c of the body frame 10, a space 70 is generated. Via this space 70, coupling of the joint 82 can be confirmed as illustrated in FIG. 4.

Figure 8:
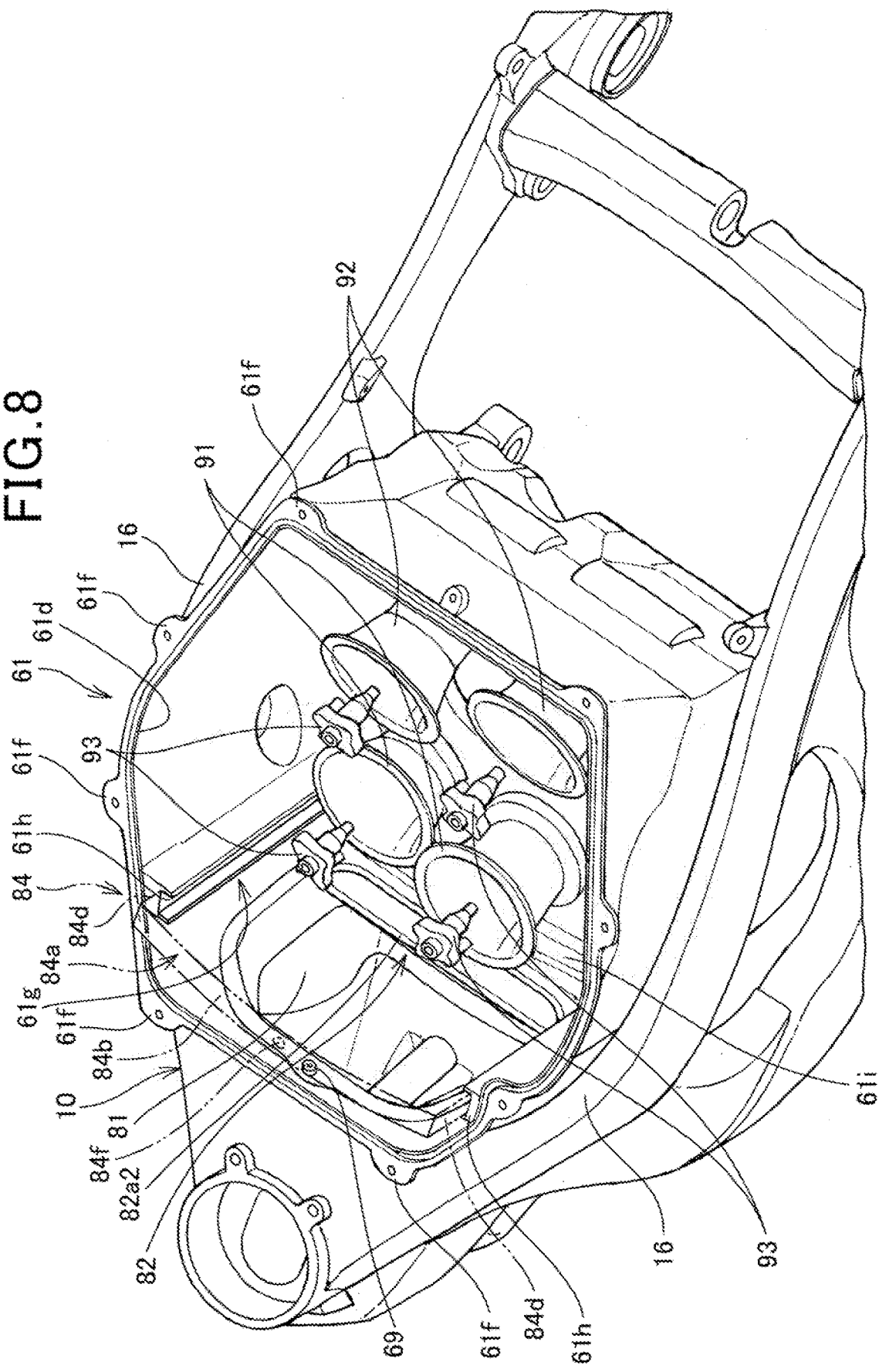
FIG. 8 is a rear perspective view that corresponds to FIG. 4.
Figure 9:
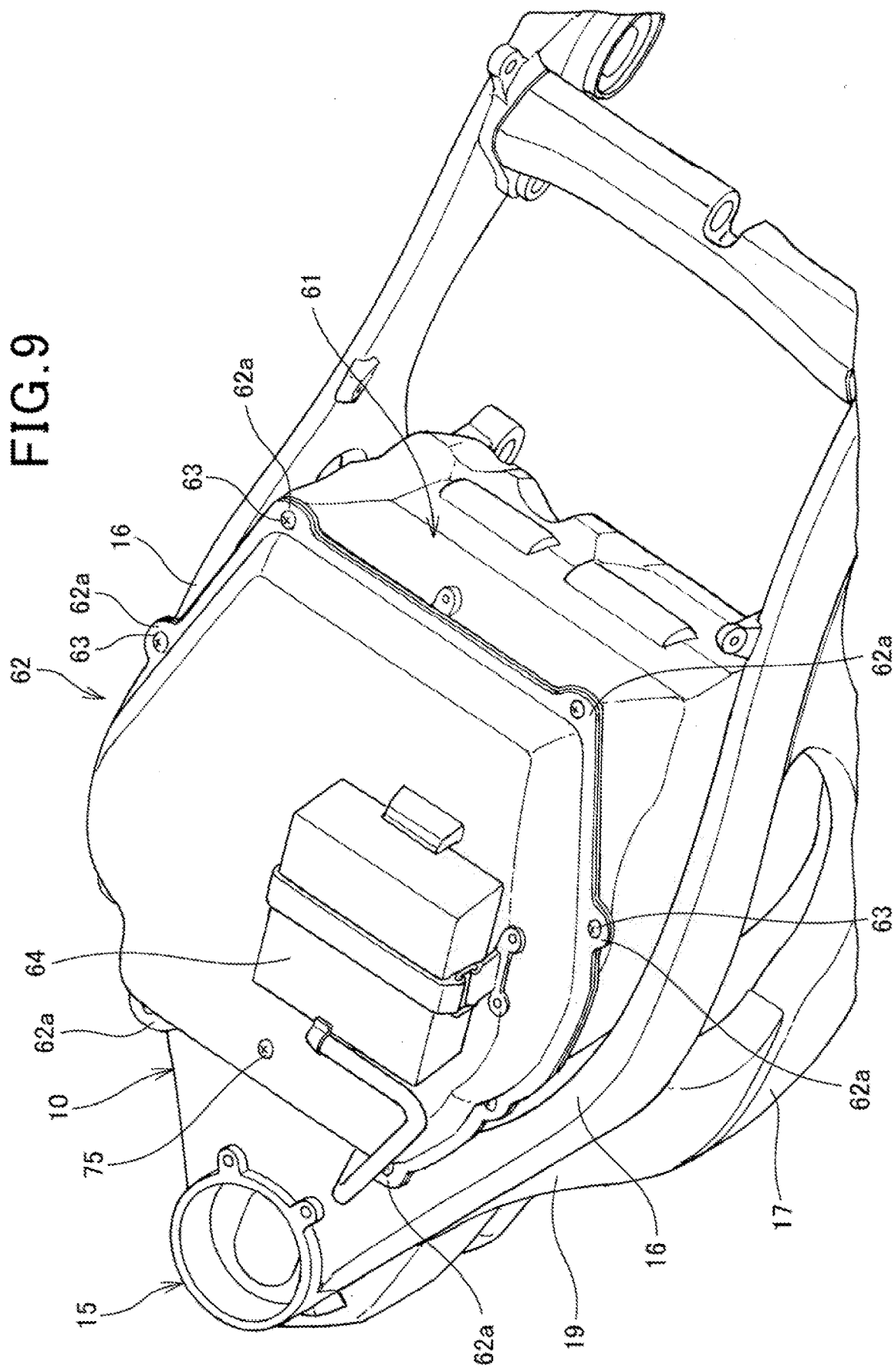
FIG. 9 is a rear perspective view illustrating a state where the box main body is covered with a box cover.

FIG. 8 is a rear perspective view that corresponds to FIG. 4. In FIG. 8, the filter element 84 is indicated by a two-dot chain line. FIG. 9 is a rear perspective view illustrating a state where the box main body 61 is covered with the box cover 62.

The box main body 61 is in a bowl shape with an opened upper surface. The box main body 61 has an approximately hexagonal-shaped upper opening edge 61d whose center portion in the front and rear direction is formed wide. Around the upper opening edge 61d, a plurality of fastening pieces 61f are formed.

The upper opening edge 61d of the box main body 61 is covered with the box cover (lid member) 62. The box cover 62 includes a plurality of fastening pieces 62a corresponding to the respective fastening pieces 61f of the box main body 61. Through the fastening piece 62a and the fastening piece 61f, a bolt 63 is inserted. The bolt 63 and a nut 65 fasten the box main body 61 and the box cover 62.

Figure 10:
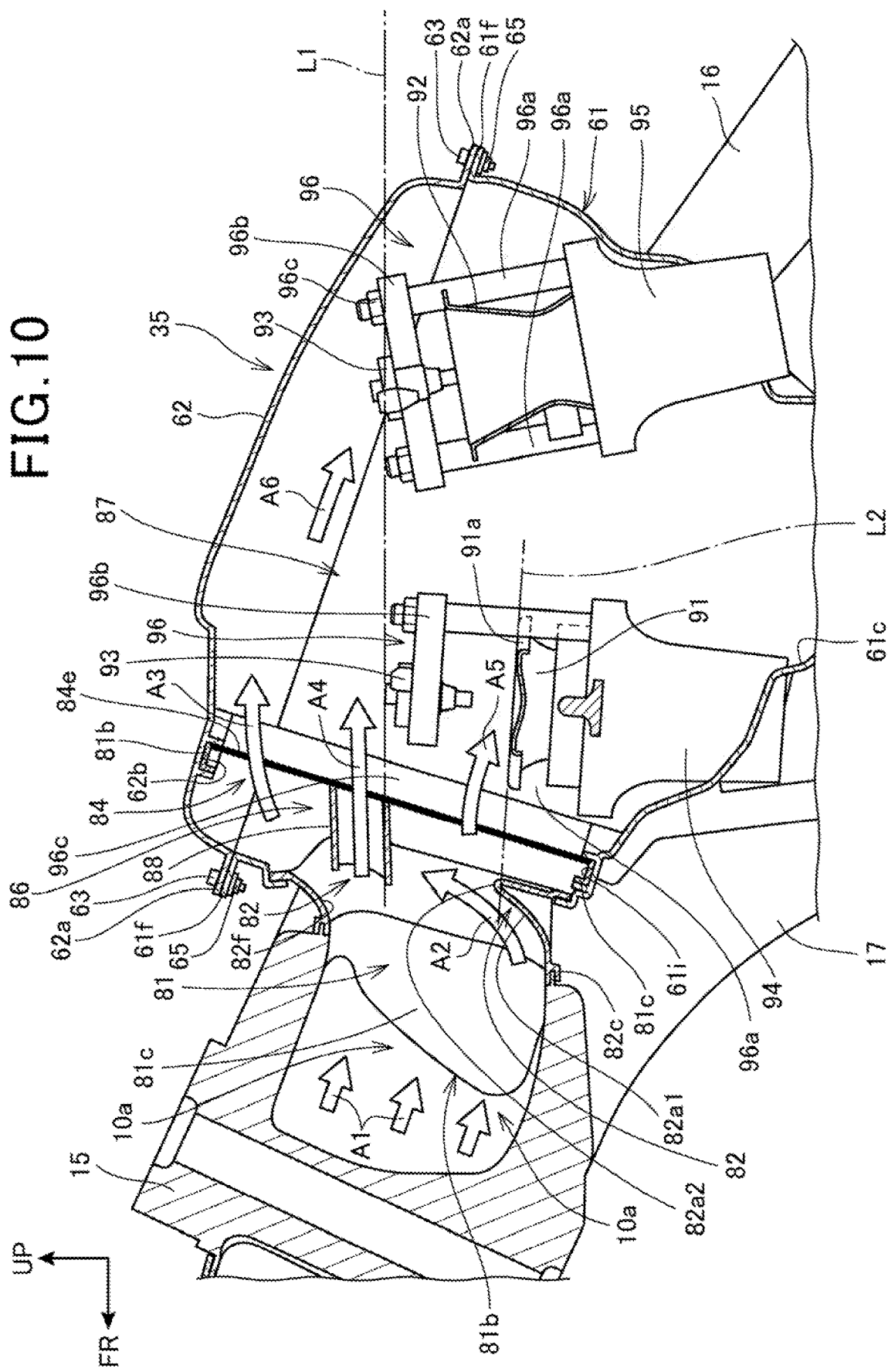
FIG. 10 is a main part enlarged view of FIG. 3.

FIG. 10 is a main part enlarged view of FIG. 3.

As illustrated in FIG. 8 and FIG. 10, in front of the air funnels 91 in the front side, the above-described filter element (air filter) 84 is arranged. The filter element 84 curves to convex forward. The filter element 84 includes a square-ring shaped frame body 84a. The frame body 84a is formed into a cross-sectional U shape as illustrated in FIG. 8. The frame body 84a includes an upper portion 84b, a lower portion 84c, and a left and right pair of side portions 84d. The frame body 84a supports a filter main body 84e through which an air passes in the thickness direction such that the air is purified.

The filter element 84 is attachably/detachably mounted to a filter mounting portion 61g of the box main body 61. The filter mounting portion 61g includes a left and right pair of side portion guide grooves 61h and a fitting groove 61i formed on an upper surface of the bottom wall 61c. The side portion guide groove 61h extends perpendicular to the upper opening edge 61d and toward the bottom wall 61c. The filter element 84 is guided by having the side portions 84d inserted along the side portion guide grooves 61h, and thus, the lower portion 84c fits in the fitting groove 61i. That is, the filter element 84 is mounted to the box main body 61.

The filter element 84 has the upper portion 84b positioned in an upper side with respect to the upper opening edge 61d and fitted to the box cover 62.

The box cover 62 has a fitting groove 62b to which the upper portion 84b is fitted. When the box cover 62 covers the upper opening edge 61d of the box main body 61, the upper portion 84b of the filter element 84 is fitted to the fitting groove 62b of the box cover 62. The filter element 84 is sandwiched by the box main body 61 and the box cover 62. The upper portion 84b of the filter element 84 has a fixing hole 84f in the center in the vehicle width direction. Through the fixing hole 84f, a fixture 75 is inserted from the upper portion of the box cover 62 and secured.

As illustrated in FIG. 10, the box main body 61 internally supports the front side throttle bodies 94 disposed as a left and right pair in the front side, and the rear side throttle bodies 95 disposed as a left and right pair in the rear side. The front side throttle body 94 liftably supports the front side air funnel 91 that is supported with the intake passage length variable. The rear side throttle body 95 liftably supports the rear side air funnel 92 that is supported with the intake passage length variable. Each of the throttle bodies 94, 95 passes through the bottom wall 61c of the box main body 61 to be coupled to the engine 11 (see FIG. 1). The engine 11 has intake ports (not illustrated) of respective left and right pair of cylinders aligned in front and rear that are coupled to the respective throttle bodies 94, 95.

The throttle bodies 94, 95 have upper end portions as end portions on sides of the air funnels 91, 92 that are in radially expanding shapes. The throttle bodies 94, 95 have upper ends that support towers 96. The tower 96 includes a plurality of support pillars 96a extending in an up and down direction and a plate 96b supported between upper portions of the support pillars 96a.

The support pillar 96a has both ends in an axial direction where threads (not illustrated) are formed. The support pillars 96a have lower end portions fastened to upper end portions of the throttle bodies 94, 95. The support pillar 96a has an upper end portion on which the plate 96b is mounted and fastened with a nut 96c. To the plate 96b, an injector 93 is secured with a fixture (not illustrated). The injector 93 is disposed inside the box main body 61. Between the injector 93 and the box cover 62 in the upper side, a space where the intake air flows is formed.

Thus, the injectors 93 are supported by intake system members, such as the air funnel 91, 92 and the throttle bodies 94, 95 via the towers 96, thereby ensuring causing the upper spaces of the injectors 93 to be the intake passages, and thus, the intake air flows as indicated by an arrow A6 in FIG. 10.

The rear side injector 93 overlaps a virtual line L1 passing through an upper end of the front side injector 93 and extending in a horizontal direction in side view, and is positioned in the upper side with respect to the front side injector 93. As indicated by the arrow A6, the intake air flowing into the upper side in the air cleaner box 35 easily flows to the rear side injector 93.

The filter element 84 in front of the front side air funnel 91 is disposed. The filter element 84 is slightly inclined such that the upper side is positioned to the rear, and is disposed approximately perpendicular to the front and rear direction.

The filter element 84 includes the rectangular pipe shaped air guide port (louver) 88. The air guide port 88 is supported between the left and right side portions 84d of the frame body 84a. The air guide port 88 is supported upward in a middle part in the vertical direction of the side portion 84d.

Disposing the air guide port 88 gives the intake air a directionality, thereby ensuring taking in the intake air to be oriented upward in the air cleaner box 35, and thus, the intake air can be flown as indicated by an arrow A4. Accordingly, the intake air can easily flow to the rear side air funnel 92 and the rear side injector 93.

The air guide port 88 extends forward, and inclines forward with respect to the side portions 84d of the filter element 84. The air guide port 88 projects forward with respect to the filter main body 84e to extend toward a side of the dirty side 86. The existence of the air guide port 88 does not have any influence on a volume in a side of the clean side 87. Accordingly, there is no influence on the injector 93 and the like arranged inside the air cleaner box 35.

The air guide port 88 extends up to a position where the air guide port 88 overlaps the joint 82 in side view through the opening (intake air opening) 61b of the box main body 61. The air guide port 88 has a long shape in front and rear that extends up to the intake passage formed by the joint 82. Accordingly, the air guide port 88 can give a directionality to the intake air.

The air guide port 88 is positioned in the upper side with respect to the plate 96b of the front side tower 96. Approximately the whole air guide port 88 is positioned in the upper side with respect to the front side injector 93 and positioned in the upper side with respect to the virtual line L1. The air guide port 88 is parallel to the intake passage 10a. The air guide port 88 is easily held in a state parallel to the ground.

Approximately the whole air guide port 88 is positioned in the upper side with respect to the front side injector 93. Accordingly, the intake air guided by the air guide port 88 can be the intake air oriented to the upper side of the front side injector 93 as indicated by the arrow A4.

The joint 82 has a lower surface portion (lower side portion) where the guiding portion 82a oriented upward is formed. The guiding portion 82a has a front surface 82a1 oriented to the air guide port 88 by inclining upward as approaching the rear.

The guiding portion 82a orients the flow of the intake air flowing into the joint 82 as indicated by the arrow A1 upward as indicated by the arrow A2. Accordingly, it is possible to reduce the intake air directly flowing in to the front side air funnel 91 and actively orient the intake air toward a side of the air guide port 88. That is, as indicated by the arrow A5, the momentum of the intake air received by the front side intake system can be dispersed.

An upper end 82a2 of the guiding portion 82a is positioned in the upper side with respect to the virtual line L2 extending along an open end (upper side portion) 91a of the front side air funnel 91. Accordingly, it is possible to orient the intake air further upward compared with a case where the upper end 82a2 is positioned in the lower side with respect to the virtual line L2.

An upper surface portion (upper side portion) 82f of the joint 82 inclines upwardly toward the rear. The upper surface portion 82f inclines approximately similarly to the front surface 82a1 of the guiding portion 82a. Between the air guide port 88 and the upper surface portion 82f, the space where the intake air passes through is formed. As indicated by the arrow A3, the intake air can flow in the upper side of the air guide port 88, and the intake air is easily flown further upward.

As described above, according to the embodiment to which the present invention is applied, the air intake structure of a saddle riding vehicle is disposed on the motorcycle 1 that includes the intake system components 35, 91, 92, 94, 95 above the engine 11, the engine 11 includes the left and right pair of cylinders (not illustrated) aligned in front and rear, the intake system components 35, 91, 92, 94, 95 include: the air funnels (funnels) 91, 92 coupled to the intake ports of the respective cylinders; and the injectors 93 arranged at the positions facing the openings of the respective air funnels 91, 92, the air funnels 91, 92 and the injectors 93 are arranged inside the air cleaner box (air box) 35, and the air intake structure includes the filter element 84 in the front side with respect to the air funnel 91 and the injector 93 disposed in the cylinder in the front side. In the air intake structure of a saddle riding vehicle, the filter element 84 is at least disposed so as to be oriented in the vertical direction in side view, and the filter element 84 has the middle part on which the air guide port 88 is disposed. With this configuration, disposing the air guide port 88 gives the intake air a directionality, and thus, it is possible to take in an air so as to orient the air to the upper side in the air cleaner box 35, thereby ensuring easily flowing the intake air to the air funnel 92 and the injector 93 in the rear side.

In this embodiment, the air cleaner box 35 is in a bowl shape with the opened upper surface, and is in a shape with the upper side covered with the box cover 62. The injectors 93 are supported by the towers 96 disposed on the funnels 91, 92. Accordingly, the injector 93 is supported by the intake system components inside the air cleaner box 35, thereby ensuring the space in the upper side of the injector 93 being the intake passage.

In this embodiment, the air guide port 88 is positioned in the upper side with respect to the front side injector 93. Accordingly, the intake air can be oriented upward of the front side injector 93.

In this embodiment, the air guide port 88 may project to the side of the dirty side 86. With this configuration, the air guide port 88 is disposed in the space in the dirty side 86 upstream of the filter element 84; therefore, there is no influence on the volume of the side of the clean side 87.

In this embodiment, the opening 61b coupled to the intake passage 10a is disposed at the front end of the air cleaner box 35, and the air guide port 88 extends up to the position where the air guide port 88 overlaps the joint 82 forming the intake passage 10a in side view. Accordingly, the air guide port 88 is the long louver in front and rear extending up to the intake passage 10a, and can give the directionality to the intake air.

In this embodiment, the lower side portion of the intake passage 10a on which the guiding portion 82a that orients upward is provided. Accordingly, the flow of the intake air flowing in from the upper stream of the intake passage 10a is oriented upward; therefore, it is possible to reduce the intake air directly flowing in to the front side funnel 91 inside the air cleaner box 35 and actively orient the intake air to the air guide port 88 side.

In this embodiment, the upper end of the guiding portion 82a is positioned in the upper side with respect to the open end 91a of the front side funnel 91. Accordingly, furthermore, it is possible to reduce the intake air directly flowing in to the front side funnel 91 inside the air cleaner box 35 and actively orient the intake air to the louver side.

In this embodiment, the upper surface portion 82f of the intake passage 10a inclines upwardly toward the rear, and the space is provided between the upper portion of the air guide port 88 and the upper surface portion 82f of the intake passage 10a. Accordingly, the intake air can be flown into the filter element 84 in the upper side of the air guide port 88.

In this embodiment, the rear side injector 93 is positioned in the upper side with respect to the front side injector 93. Accordingly, the rear side injector 93 can easily suction the intake air flowing to the upper side.

The above-described embodiment is given to merely illustrate an aspect of the present invention, and any modification and application are possible without departing from the spirit of the present invention.

For example, while in the above-described embodiment, the engine 11 includes the left and right pair of cylinders aligned in front and rear, it is at least necessary that the cylinders are aligned in front and rear.

The present invention is also applicable to a saddle riding vehicle besides the motorcycle 1, not limited to the case where the present invention is applied to the motorcycle 1. The saddle riding vehicle includes vehicles in general on which a rider straddles a vehicle body to get, and a vehicle including not only the motorcycle (including a motorized bicycle), but also a three-wheeled vehicle or a four-wheeled vehicle classified in an All Terrain Vehicle (ATV).

REFERENCE SIGNS LIST

10a . . . Intake passage
11 . . . Engine
35 . . . Air cleaner box (air box, intake system component)
61b . . . Opening (intake air opening)
62 . . . Box cover (lid member)
82a . . . Guiding portion
82f . . . Upper surface portion (upper side portion)
84 . . . Filter element (air filter)
86 . . . Dirty side
88 . . . Air guide port (louver)
91 . . . Front side air funnel (front side funnel, intake system component)
91a . . . Open end (upper side portion)
92 . . . Rear side air funnel (rear side funnel, intake system component)
93 . . . Injector 94 . . . Front side throttle body (intake system component)
95 . . . Rear side throttle body (intake system component)
96 . . . Tower

The invention claimed is:

1. An air intake structure of a saddle riding vehicle,
in which the air intake structure is disposed on the saddle riding vehicle that includes intake system components above an engine,
the engine includes a plurality of cylinders, and includes cylinders aligned at least in front and rear,
the intake system components include funnels coupled to intake ports of the respective cylinders, and injectors arranged at positions facing openings of the respective funnels,
the funnels and the injectors are arranged inside an air box,
the air intake structure includes an air filter in a front side with respect to the funnel and the injector disposed in a cylinder in a front side,
wherein the air filter is at least disposed so as to be oriented in a vertical direction in side view, and
the air filter has a middle part on which a louver is disposed.

2. The air intake structure of a saddle riding vehicle according to claim 1,
wherein the air box is in a bowl shape with an opened upper surface, and in a shape with an upper portion covered with a lid member,
the injectors are supported by towers disposed on the funnels.

3. The air intake structure of a saddle riding vehicle according to claim 1,
wherein the louver is positioned in an upper side with respect to the injector in a front side.

4. The air intake structure of a saddle riding vehicle according to claim 1,
wherein the louver projects to a side of a dirty side.

5. The air intake structure of a saddle riding vehicle according to claim 4,
wherein the air box has a front end on which an intake air opening coupled to an intake passage is disposed, and
the louver extends up to a position where the louver overlaps with the intake passage in side view.

6. The air intake structure of a saddle riding vehicle according to claim 5,
wherein the intake passage has a lower side portion on which a guiding portion that orients upward is provided.

7. The air intake structure of a saddle riding vehicle according to claim 6,
wherein the guiding portion has an upper end positioned in an upper side with respect to an upper side portion of the front side funnel.

8. The air intake structure of a saddle riding vehicle according to claim 7,
wherein the intake passage has an upper side portion that inclines upwardly toward the rear, and
a space is provided between an upper portion of the louver and the upper side portion of the intake passage.

9. The air intake structure of a saddle riding vehicle according to claim 1,
wherein the injector in a rear side is positioned in an upper side with respect to the front side injector.

* * * * *